(12) United States Patent
Hu

(10) Patent No.: US 8,928,211 B2
(45) Date of Patent: Jan. 6, 2015

(54) 360-DEGREE PROJECTION LED BULB STRUCTURE

(71) Applicant: Wen-Sung Hu, Tainan City (TW)

(72) Inventor: Wen-Sung Hu, Tainan City (TW)

( * ) Notice: Subject to any disclaimer, the term of this patent is extended or adjusted under 35 U.S.C. 154(b) by 231 days.

(21) Appl. No.: 13/716,259

(22) Filed: Dec. 17, 2012

(65) Prior Publication Data

US 2014/0168977 A1  Jun. 19, 2014

(51) Int. Cl.
*F21V 3/02* (2006.01)
*F21V 29/00* (2006.01)
*F21V 3/00* (2006.01)

(52) U.S. Cl.
CPC ................................. *F21V 29/20* (2013.01)
USPC ................. 313/46; 362/249.03; 362/249.07; 362/232

(58) Field of Classification Search
CPC ............... F21Y 2111/005; F21Y 2111/001; F21Y 2111/007; F21Y 2105/003; F21Y 2105/005; F21V 21/30; F21V 14/02; F21V 21/14; F21V 19/02; F21K 9/13
USPC .................... 313/42–47; 362/235–249.19
See application file for complete search history.

(56) References Cited

U.S. PATENT DOCUMENTS

| | | | | |
|---|---|---|---|---|
| 5,688,042 | A * | 11/1997 | Madadi et al. | 362/240 |
| 8,033,685 | B2 * | 10/2011 | McGehee et al. | 362/249.02 |
| 2009/0080205 | A1 * | 3/2009 | Chang et al. | 362/373 |
| 2011/0063845 | A1 * | 3/2011 | Myers et al. | 362/249.16 |
| 2011/0089838 | A1 * | 4/2011 | Pickard et al. | 315/113 |
| 2012/0320594 | A1 * | 12/2012 | Chien | 362/249.03 |

* cited by examiner

*Primary Examiner* — Karabi Guharay
*Assistant Examiner* — Nathaniel Lee
(74) *Attorney, Agent, or Firm* — Alan D. Kamrath; Kamrath IP Lawfirm, P.A.

(57) ABSTRACT

A 360-degree projection LED bulb includes a bulb holder, a transparent bulb seat, a transparent bulb shell, an upper luminosity module, a heat dissipating seat, and a plurality of sidelight luminosity modules. The upper luminosity module includes upper LEDs supported within an upper end of the transparent bulb seat and can be driven to project light beams towards the transparent bulb shell. The heat dissipating seat is engaged on a lower end face of an upper LED substrate of the upper luminosity module and includes side walls formed as an annular polygon. Each sidelight luminosity module is mounted on an associated side wall and includes a lateral LED substrate and at least one lateral LED disposed on the lateral LED substrate. Each lateral LED can be driven to radiate horizontally and downward via the transparent bulb seat. As such, the LED bulb realizes wide-angle radiation effect and superior cooling effect.

10 Claims, 16 Drawing Sheets

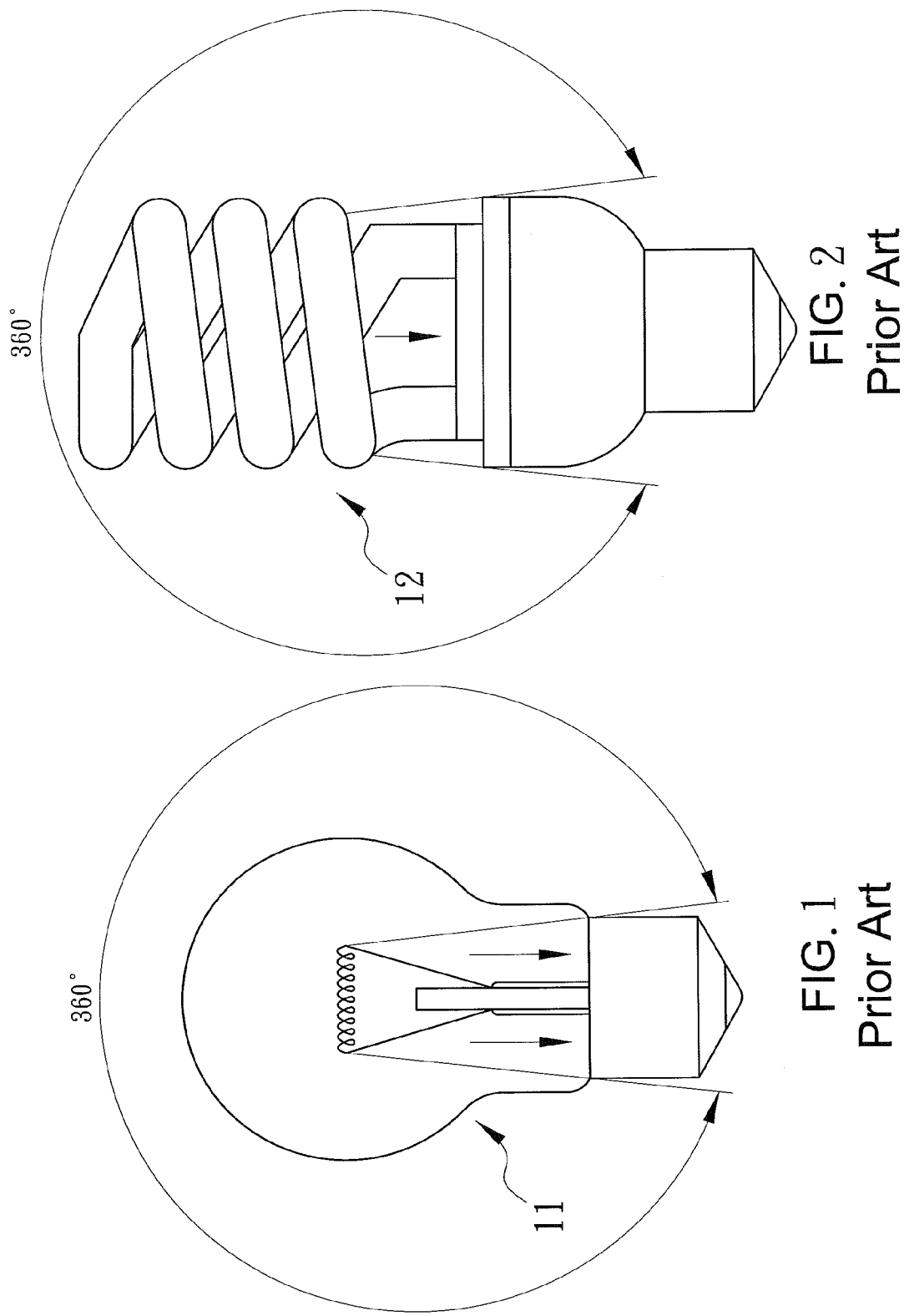

360-DEGREE PROJECTION LED BULB STRUCTURE

BACKGROUND OF THE INVENTION

1. Field of the Invention

The present invention relates to a LED bulb, and, more particularly, to a high illumination LED bulb structure with a 360-degree projection light.

2. Description of the Related Art

As the green energy policy is highly promoted in international society, many advanced countries have thus set up the utilization deadline for tungsten bulbs. Light-emitting diode (LED) bulbs thus gradually enter the replacement market of tungsten bulbs.

The optical sources of traditional tungsten bulb 11 and energy saving bulb 12 project a 360-degree light (as shown in FIGS. 1-2), but the bulb 13 (as shown in FIG. 3) currently based on LED (Surface-Mount Device LED or chip) as optical source can only make projection light in single direction, failing to project the same 360-degree light as the tungsten bulb 11 and the energy saving bulb 12. The LED bulb 13 with single direction projection light can be only utilized in a type of lamp with illumination from the ceiling to the floor. Accordingly, general lamps with upward bulb holders have been replaced by compact fluorescent lamps (CFL) such as HCFL and CCFL when tungsten light bulbs were out of time.

Compact fluorescent lamps, however, still have some drawbacks as follows: (1) Intermittent light from a luminous source activated by variable voltages is unhealthy for eyes during reading. (2) Mercury gas in a compact fluorescent lamp threatens the human body with the lamp broken and some costs are indispensable to disposal of compact fluorescent lamps. (3) Ultraviolet projected from a compact fluorescent lamp is harmful to skin in a short distance. As a result, an LED bulb 14 (as shown in FIG. 4) designed by some LED manufacturers and available currently has a longer transparent bulb shell 141 farther spaced from a luminous source of the LED 142, increasing beam angles due to downward retro-light synchronously generated with projected light which penetrates the transparent bulb shell 141. On the other hand, an LED bulb 15 (FIG. 5) features a longer transparent bulb shell 151 and lifted LEDs 152 as a luminous source which intensifies downward retro-light. However, halo which is radiated under effect of non-direct light such as retro-light intensifies visible light in a room but contributes illumination necessary for reading a little (e.g., D2 from a desk lamp 16 in FIG. 6).

In order to increase beam angles of an LED bulb, alternative LED bulbs 2, 3, 4 (as shown in FIGS. 7, 8, and 9) radiating horizontally was manufactured, but the luminous source of LEDs 21 of the LED bulb 2 of FIG. 7 and the luminous source of LEDs 31 of the LED bulb 3 of FIG. 8 still fail to project light toward bulb holder 22, 32 respectively. Further, the luminous source of LEDs 41 of the LED bulb 4 of FIG. 9 will be blocked by a lower cover 42, failing to project a 360-degree light to improve illumination of a floor lamp, a desk lamp, a wall lamp or a bedside lamp.

Thus, how to design LED bulb with a 360-degree projection light to match the utilization of lamps such as floor lamps, desk lamps, wall lamps or bedside lamps and to increase the illumination scope of the projection light is really the top urgent matter of the LED industries.

BRIEF SUMMARY OF THE INVENTION

Therefore, it is an objective of the present invention to overcome the aforementioned shortcoming and deficiency of the prior art by providing a 360-degree projection LED bulb. The LED bulb includes a bulb holder, a transparent bulb shell, a heat dissipating seat, and a plurality of sidelight luminosity modules. A transparent bulb seat is engaged to the bulb holder and includes a top opening formed in an upper end thereof. The transparent bulb shell is engaged with the upper end of the transparent bulb seat and closes the top opening of the transparent bulb seat so that the transparent bulb seat and the transparent bulb shell together defines a chamber therein. An actuator is mounted in the chamber. The heat dissipating seat is mounted in the chamber and includes an upper portion, a lower portion, and a plurality of side walls located between the upper and lower portions. The plurality of side walls adjoins each other to form an annular polygon. Each sidelight luminosity module is mounted on an outer surface of one of the side walls and includes a lateral LED substrate and at least one lateral LED disposed on the lateral LED substrate. Each sidelight luminosity module is electrically connected to the actuator so that the lateral LEDs of the sidelight luminosity modules can be driven to radiate horizontally and downward via the transparent bulb seat.

In a preferred form, the LED bulb further includes an upper luminosity module mounted in the chamber and including an upper LED substrate suspended and supported within the upper end of the transparent bulb seat. The upper LED substrate includes an upper end face facing the transparent bulb shell and a lower end face facing the bulb holder. At least one upper LED is disposed on the upper end face of the upper LED substrate. The upper luminosity module is electrically connected to the actuator so that the upper LED of the upper luminosity module can be driven to project light beams towards the transparent bulb shell. The heat dissipating seat is engaged on the lower end face of the upper LED substrate.

In a preferred form, a conductive substrate is mounted on a bottom face of the lower portion of the heat dissipating seat and electrically connected to the actuator, the upper LED of the upper luminosity module, and the lateral LEDs of the sidelight luminosity modules through conductive filaments. An annular ledge is formed on an inner wall of the upper end of the transparent bulb seat, and the upper LED substrate is mounted on the ledge.

The heat dissipating seat is in the form of one of a solid body, a tank-shaped body, and a hollow polygonal tubular body. Each side wall of the heat dissipating seat is a straight-lateral planar wall or an oblique-lateral planar wall.

In a preferred form, the heat dissipating seat is a hollow tank-shaped body manufactured with a high thermal conductive material and provided with cooling fins inside. The upper portion of the heat dissipating seat is formed with a planar fixing base and includes a plurality of fixing holes, so that the upper portion of the heat dissipating seat can be fixed to the lower surface of the upper LED substrate by extending a fastener through each of the fixing holes.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 1 is a schematic view of a conventional tungsten bulb.

FIG. 2 is a schematic view of a conventional energy saving bulb.

DETAILED DESCRIPTION OF THE INVENTION

Figure 4:
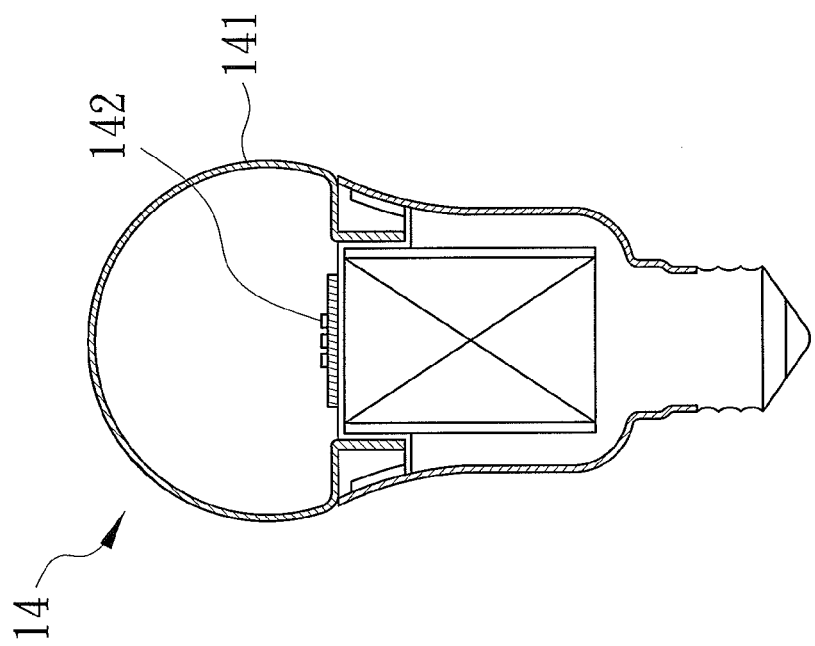
FIG. 4 is a schematic view of a second conventional LED bulb.
Figure 3:
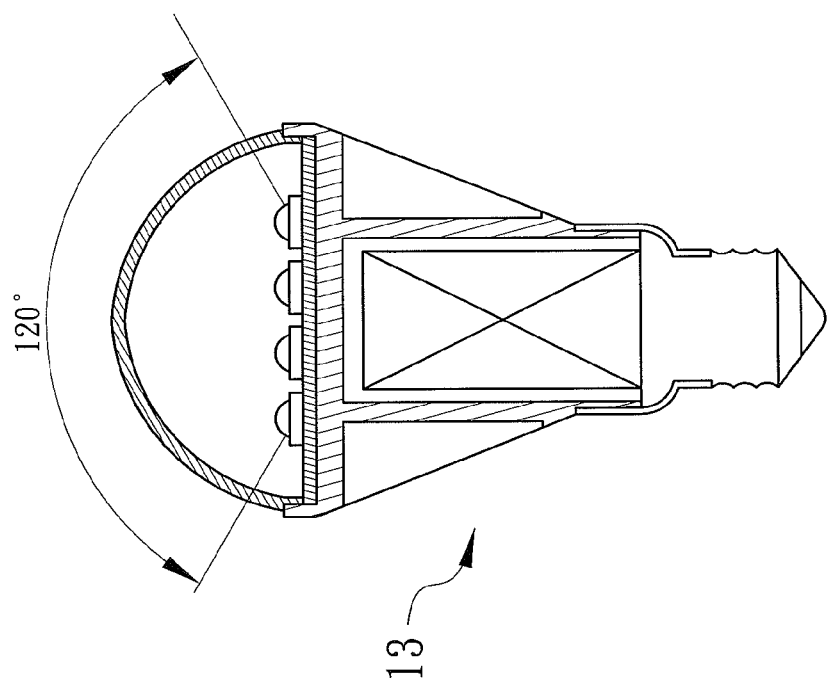
FIG. 3 is a schematic view of a first conventional LED bulb.
Figure 6:
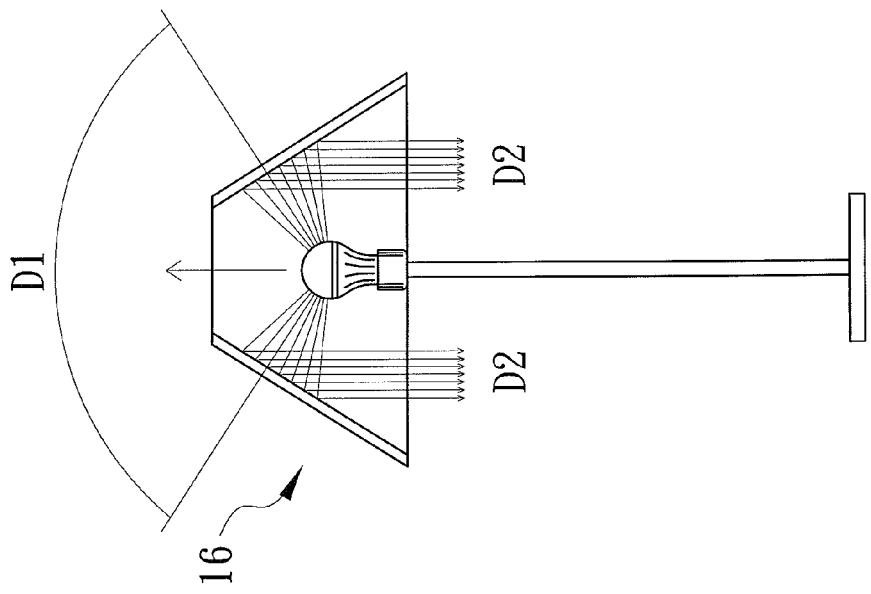
FIG. 6 shows an illustration of projection light of a conventional LED bulb used in a floor lamp.
Figure 5:
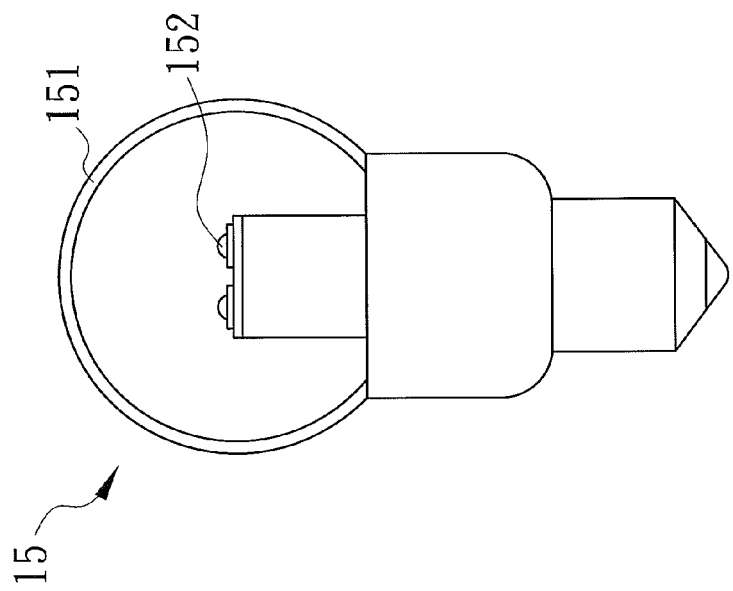
FIG. 5 is a schematic view of a third conventional LED bulb.
Figure 8:
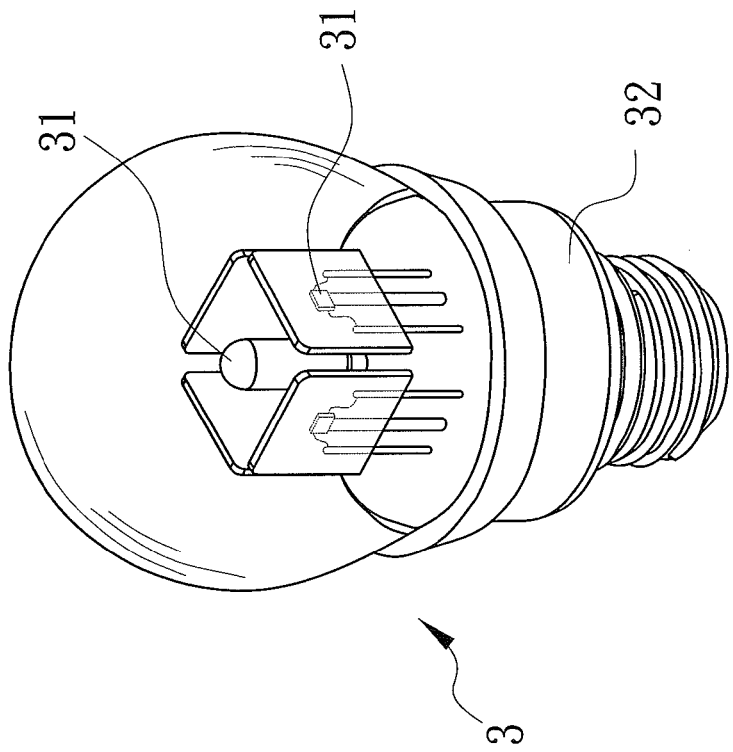
FIG. 8 is a schematic view of a second conventional LED bulb with horizontal projection of light beams.
Figure 7:
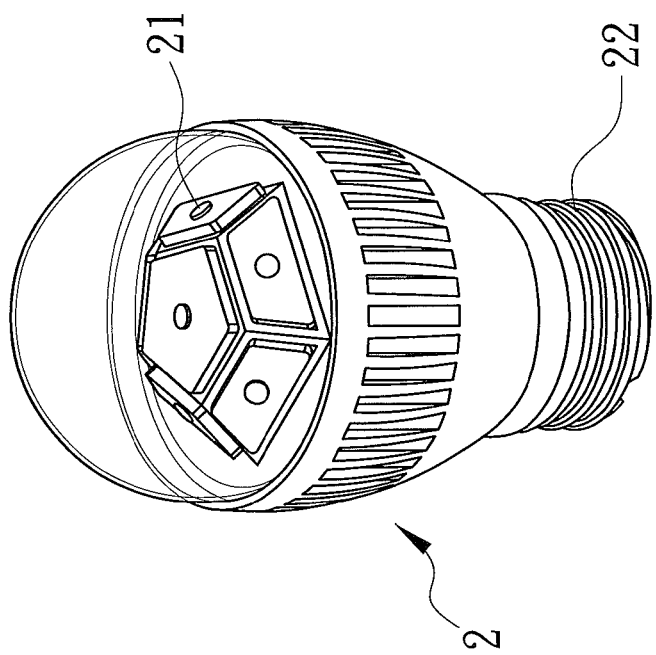
FIG. 7 is a schematic view of a first conventional LED bulb with horizontal projection of light beams.
Figure 9:
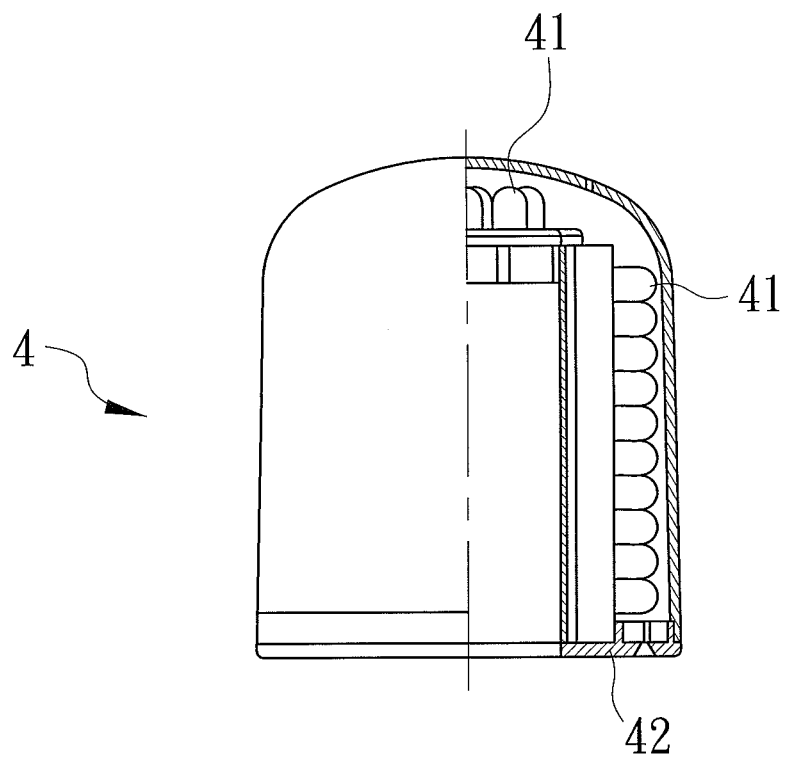
FIG. 9 is a schematic view of a third conventional LED bulb with horizontal projection of light beams.

A 360-degree projection LED bulb of a first embodiment of the present invention is shown in FIGS. 10 through 13 of the drawings and generally designated 5. The LED bulb 5 includes a bulb holder 51, a transparent bulb shell 52, an upper luminosity module 53, a heat dissipating seat 54, and a plurality of sidelight luminosity modules 55. In this embodiment, a transparent bulb seat 511 is mounted on a top end of the bulb holder 51, and an actuator 512 is mounted in a lower end of the transparent bulb seat 511. A conductive plate 513, such as a printed circuit board (PCB), is provided on an upper end face of the actuator 512. Further, an annular ledge 515 is formed on an inner wall of an upper end 514 of the transparent bulb seat 511. The transparent bulb shell 52 formed in a hemispherical shape is engaged with the upper end 514 of the transparent bulb seat 511 and closes a top opening of the transparent bulb seat 511 so that the transparent bulb seat 511 and the transparent bulb shell 52 together define a chamber 521 therein. The transparent bulb seat 511 and the transparent bulb shell 52 can be translucent or semi-translucent respectively.

The upper luminosity module 53 is mounted in the chamber 521 and includes an upper LED substrate 531 mounted on the ledge 515 so as to be supported within the upper end 514 of the transparent bulb seat 511. Further, the upper LED substrate 531 includes an upper surface 532 facing the transparent bulb shell 52 and a lower surface 533 facing the bulb holder 10. The upper luminosity module 53 further includes at least one upper LED (SMD LED or chip) 534 disposed on the upper LED substrate 531. In this embodiment, the upper LED substrate 531 includes a plurality of ventilation holes 535 extending from the upper surface 532 through the lower surface 533.

The heat dissipating seat 54 is mounted in the chamber 521 and connected to the lower surface 533 of the upper LED substrate 531 so as to be supported by the upper LED substrate 531. In this embodiment, the heat dissipating seat 54 includes an upper portion 541, a lower portion 542, and a plurality of side wall 543 located between the upper and lower portions 541 and 542. The heat dissipating seat 54 can be in the form of one of a solid body, a tank-shaped body, or a polygonal hollow tube. In this embodiment, the heat dissipating seat 54 is a hollow tank-shaped body manufactured with high thermal conductive material and provided with cooling fins (not shown) therein for better cooling effect. The upper portion 541 of the heat dissipating seat 54 is formed with a planar fixing base and includes a plurality of fixing holes 544, so that the upper portion 541 of the heat dissipating seat 54 can be fixed to the lower surface 533 of the upper LED substrate 531 by extending a fastener (not shown) through each of the fixing holes 544. A conductive substrate 545 is mounted on a bottom face of the lower portion 542 of the heat dissipating seat 54 and includes a plurality of ventilation holes 546 for cooling. The plurality of side walls 543 adjoin each other to form an annular polygon with many facet, and each side wall 543 can be one of a straight-lateral planar wall (straight flank), an oblique-lateral planar wall (oblique flank), and a profile with any geometric shape. In this embodiment, the plurality of side walls 543 constitutes six oblique-lateral planar walls.

Each sidelight luminosity module 55 is mounted on an outer surface of one of the side walls 543 and includes a lateral LED substrate 551 and at least one lateral LED (SMD LED or chip) 552 disposed on an outer face of the lateral LED substrate 551. In this embodiment, each lateral LED substrate 551 is provided with a conductive welding position 553 at each of two sides thereof, allowing circuits of the sidelight luminosity modules 55 to be electrically connected one another. Furthermore, each lateral LED substrate 551 includes a plurality of fixing holes 554, so that each lateral LED substrate 551 can be fixed to an associated side wall 543 by extending a fastener (not shown) through each of the fixing holes 554.

Figure 14:
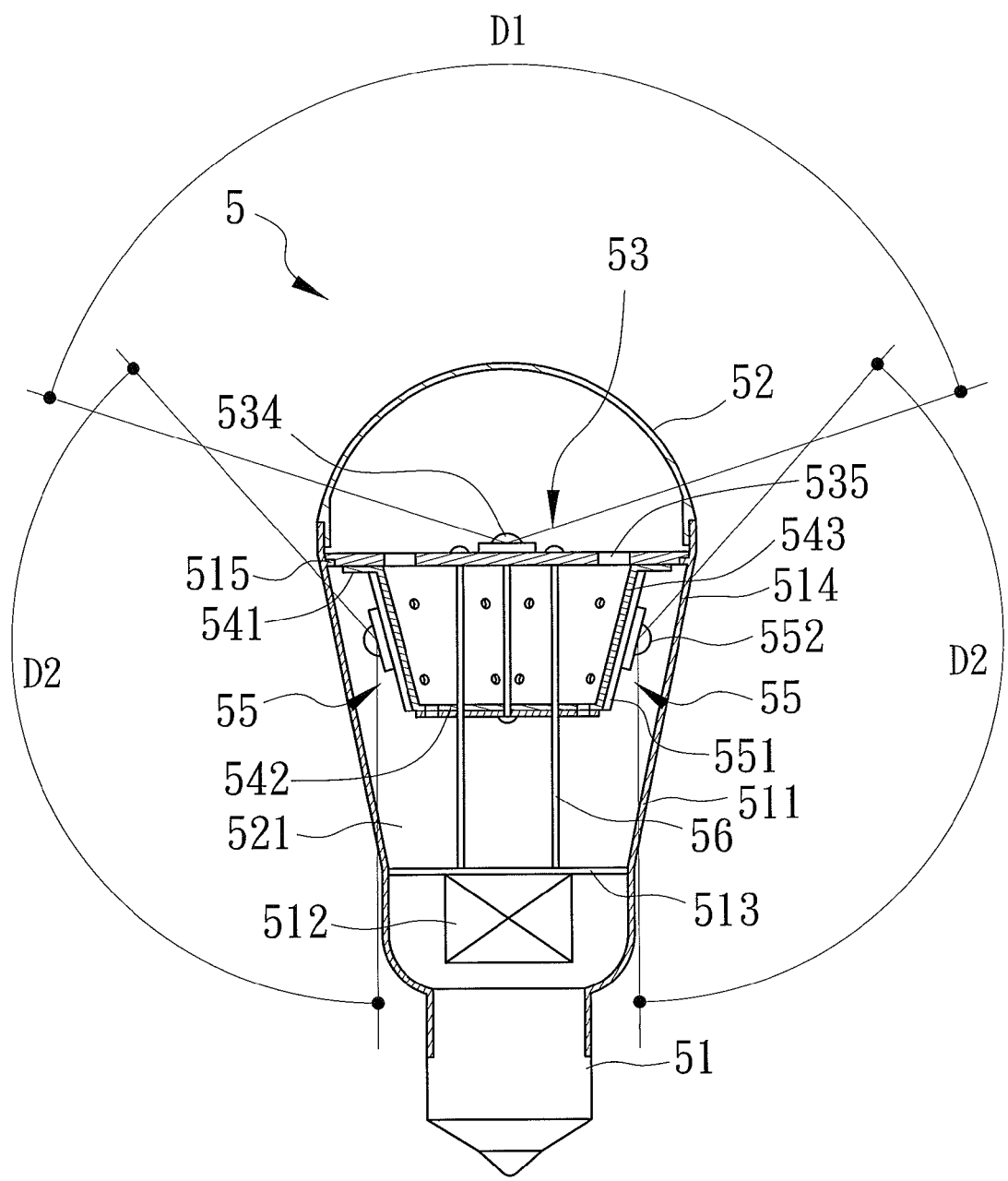
FIG. 14 an illustration of upward projection light of an upper luminosity module and sidelight and downward light of the sidelight luminosity modules of the LED bulb of FIG. 10.
Figure 15:
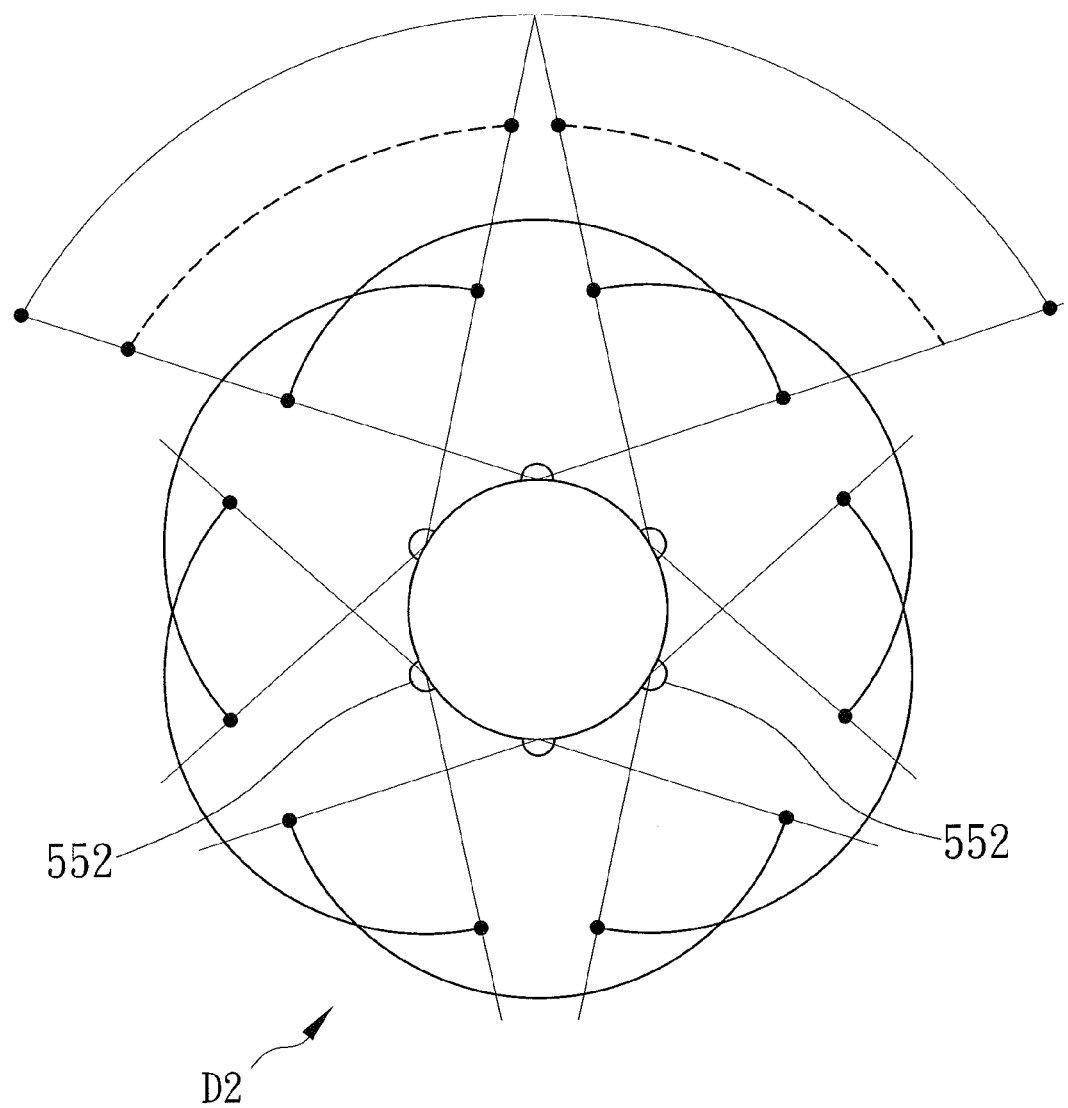
FIG. 15 is an illustration of horizontal projection light of the sidelight luminosity modules of the LED bulb of FIG. 10.
Figure 16:
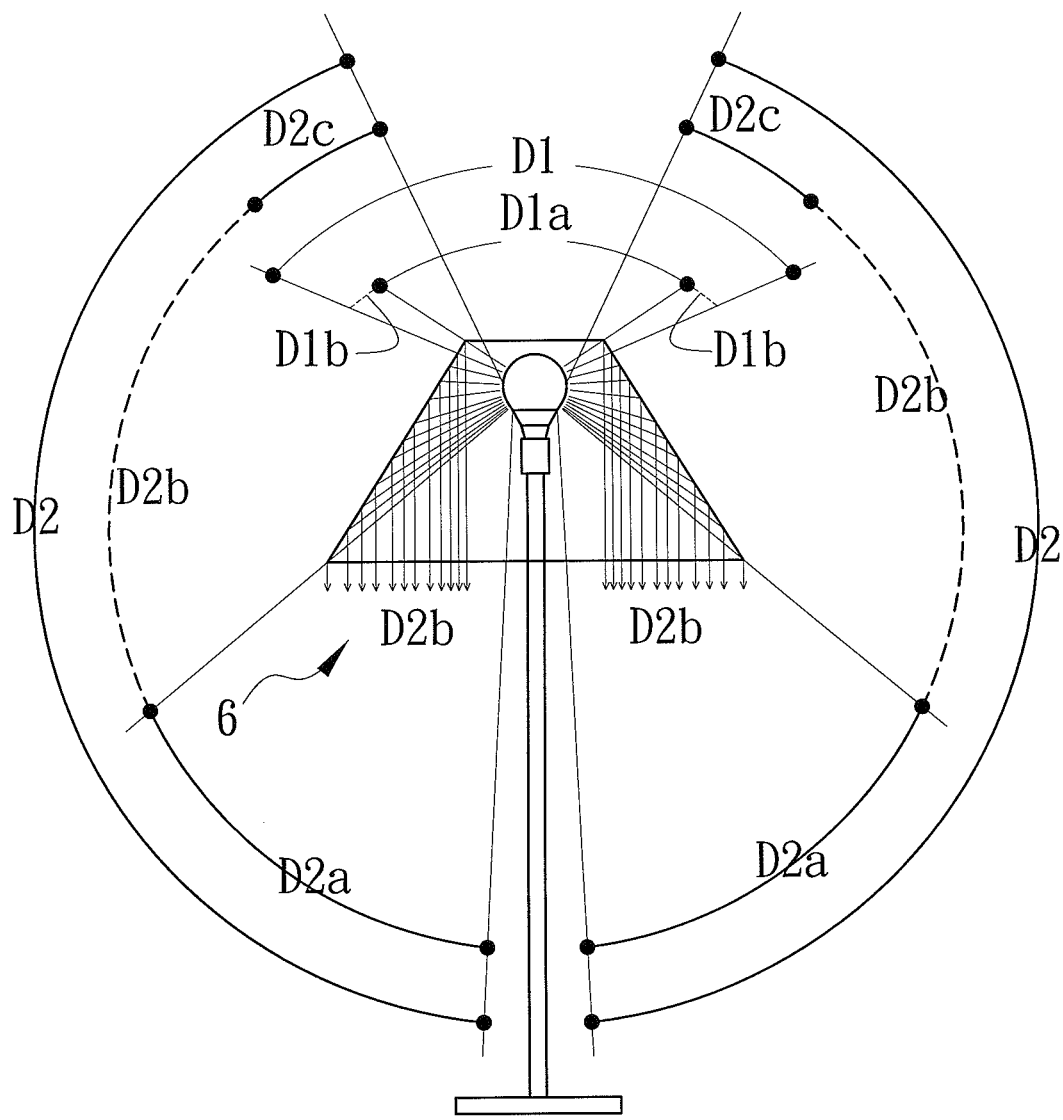
FIG. 16 shows a desk lamp and a 360-degree projection light of the LED bulb of FIG. 10 used in the desk lamp.
Figure 17:
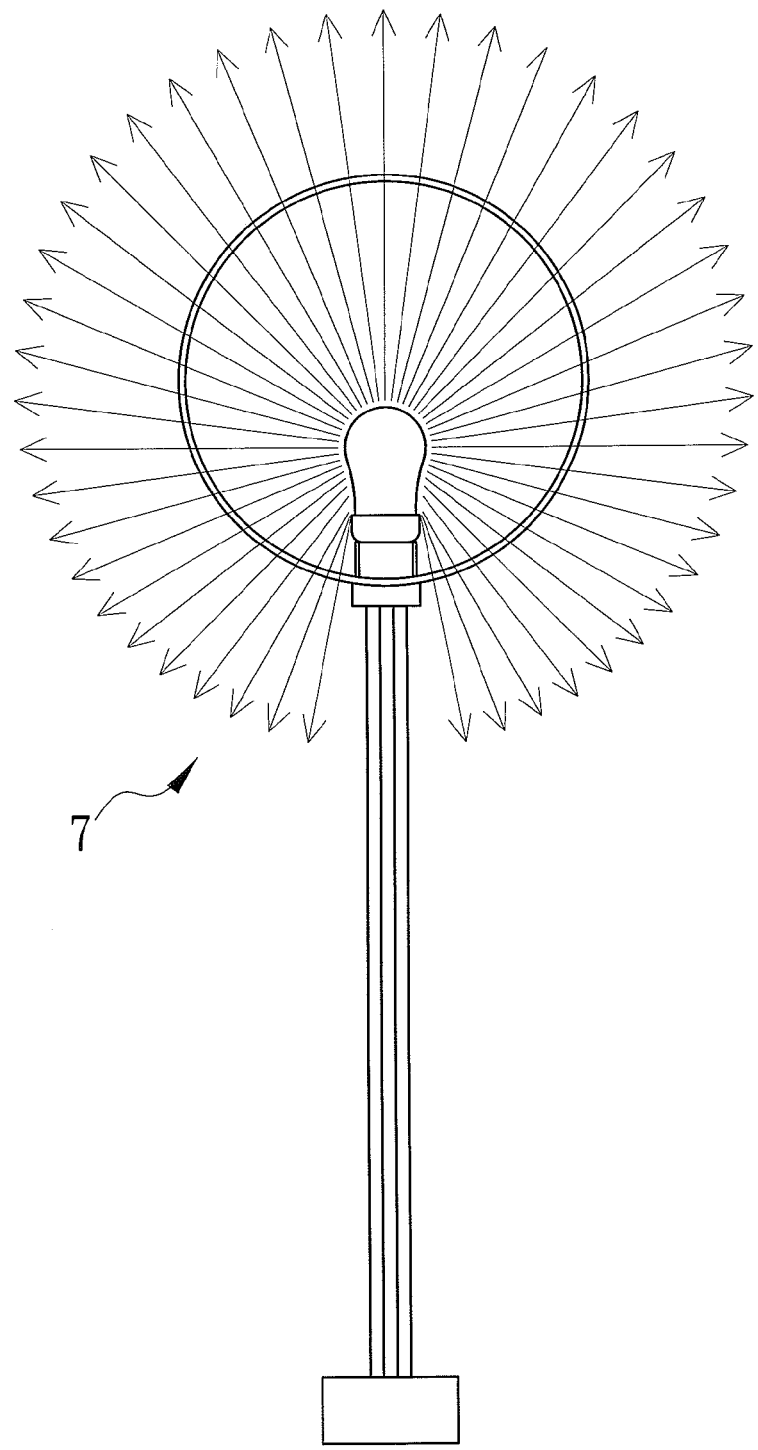
FIG. 17 shows a floor lamp and a 360-degree projection light of the LED bulb of FIG. 10 used in the floor lamp.

The conductive substrate 545 of the LED bulb 5 of the present invention is electrically connected to the actuator 512, the upper LED 534 of the upper luminosity module 53, and the lateral LEDs 552 of the sidelight luminosity modules 55 through circuits or conductive filaments 56 (that is, the conductive filaments 56 are extended through wire holes 516, 547 of the conductive plate 513 and the conductive substrate 545 and connected to conductive holes 536 of the upper LED substrate 531), so that the upper LED 534 of the upper luminosity module 53 can be actuated to radiate light beams towards the transparent bulb shell 52 (see D1 in FIG. 14), and the LEDs 552 of the sidelight luminosity modules 55 are actuated to radiate horizontally (X and Y axes) and downward (Z axis) via the transparent bulb seat 511 (see D2 in FIGS. 14 and 15), thereby a 360° full emission angle projection halo is formed. Thus, wide-angle radiation effect is available in the LED bulb 5 of the present invention which is installed on a floor lamp, a desk lamp, a wall lamp or a bedside lamp. For example, FIG. 16 is a schematic view which illustrates projected light from the LED bulb 5 of the present invention installed on a desk lamp 6, wherein D1 refers to upward direct light (D1a: direct light; D1b: reflected light), and D2 refers to sidelight and downward light (D2a: downward direct light; D2b: reflected light projected on a bulb shell; D2c: direct sidelight). Further, FIG. 17 shows the projection light illustration of the LED bulb 5 of the present invention used in a landscape lamp 7, wherein a 360° full emission angle projection halo is formed.

Figure 10:
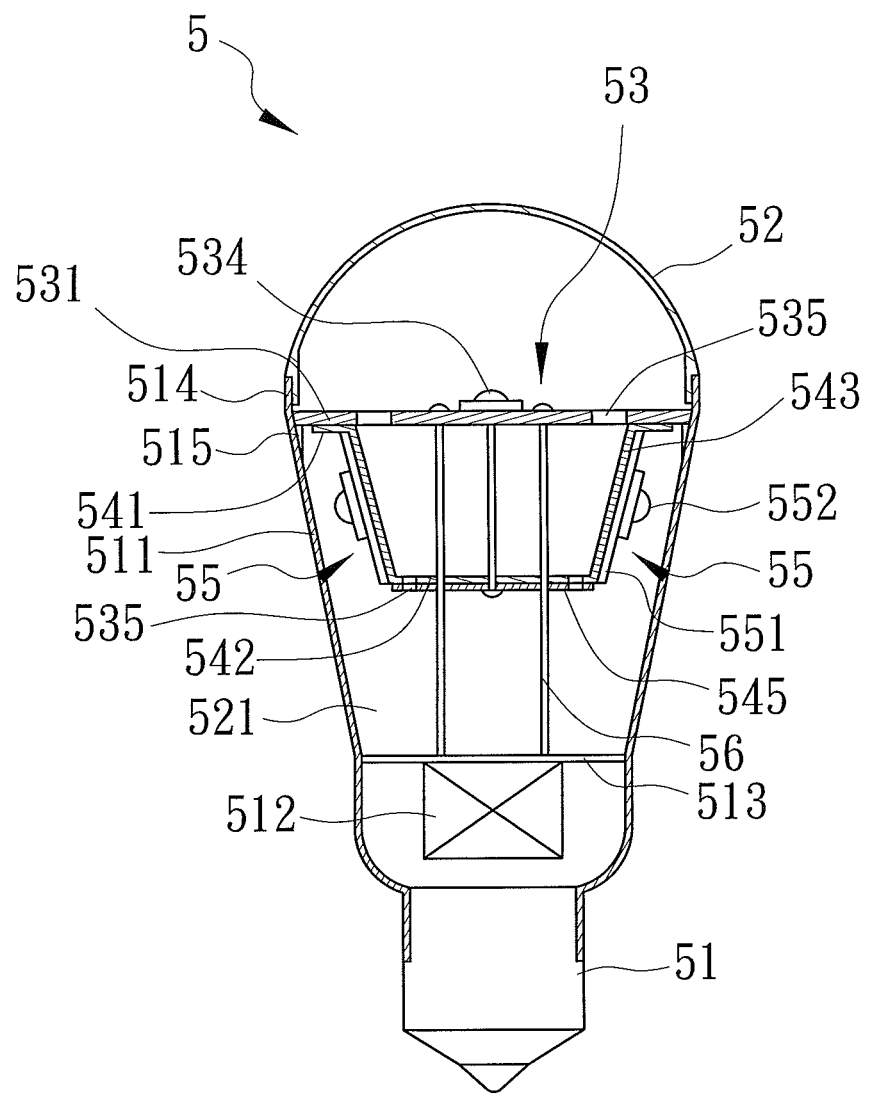
FIG. 10 is a cross sectional view of a LED bulb according to a first embodiment of the present invention.
Figure 11:
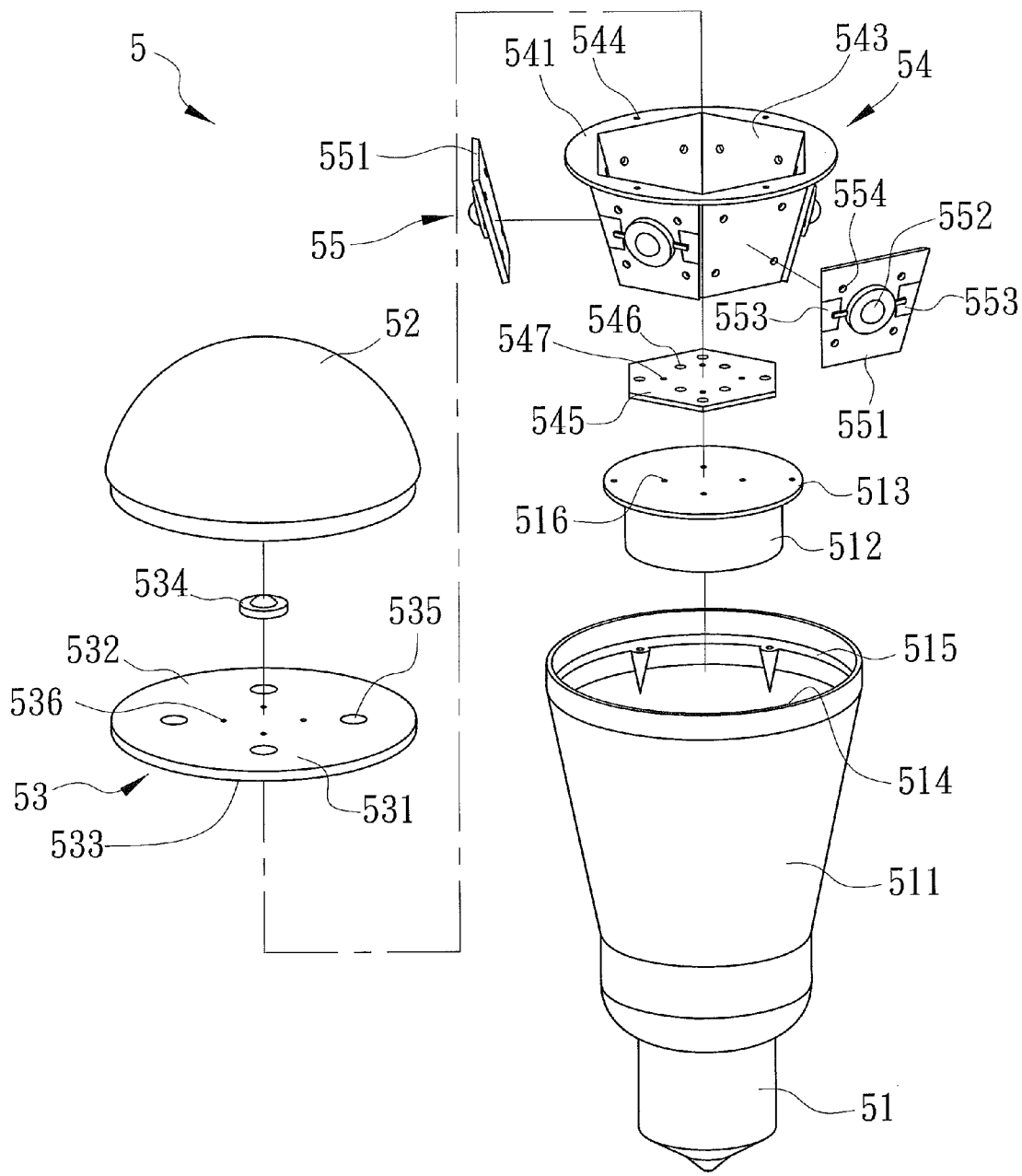
FIG. 11 is an exploded, perspective view of the LED bulb of FIG. 10.
Figure 12:
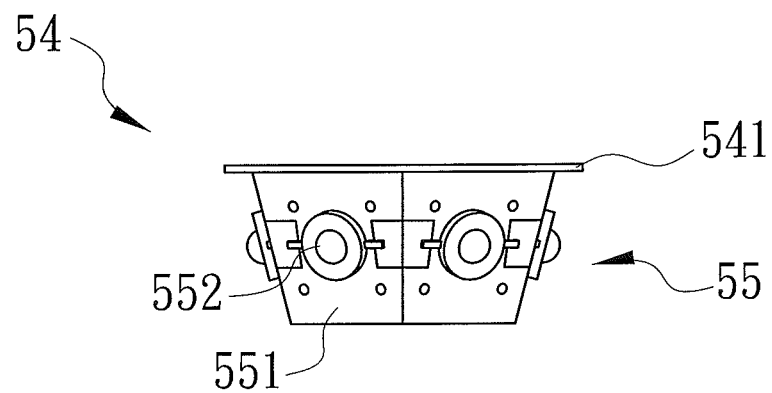
FIG. 12 is a side view of a heat dissipating seat and sidelight luminosity modules of the LED bulb of FIG. 10.
Figure 13:
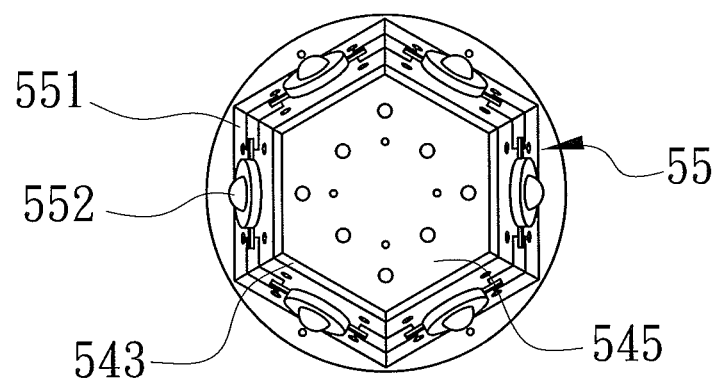
FIG. 13 is bottom plan view of the heat dissipating seat and the sidelight luminosity modules of the LED bulb of FIG. 10.
Figure 18:
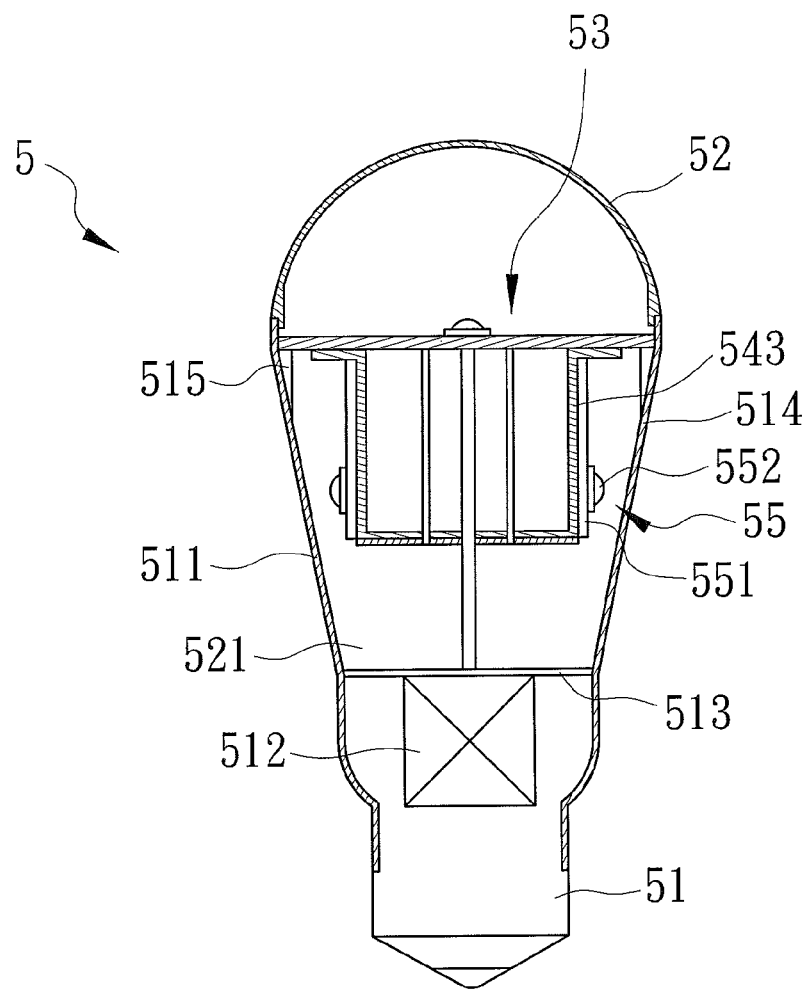
FIG. 18 is a cross sectional view of a LED bulb according to a second embodiment of the present invention.
Figure 19:
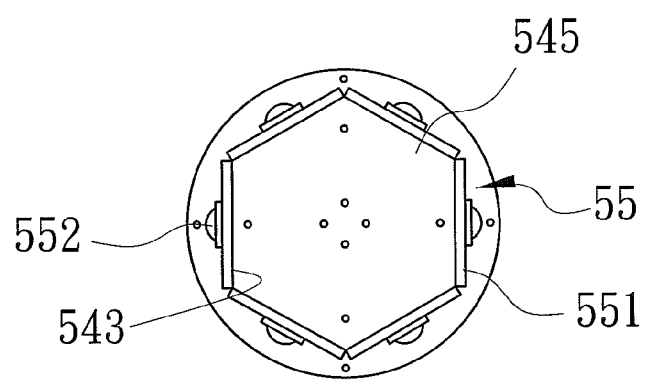
FIG. 19 is bottom plan view of the heat dissipating seat and the sidelight luminosity modules of the LED bulb of FIG. 18.

FIGS. 18 and 19 show a LED bulb 5 of a second preferred embodiment of the present invention modified from the first embodiment. Description of the parts of high illumination LED bulb 5 shown in FIG. 18 identical to those shown in FIG. 10 is omitted. In particular, each side wall 543 shown in FIG. 18 is a straight-lateral planar wall (straight flank).

Figure 20:
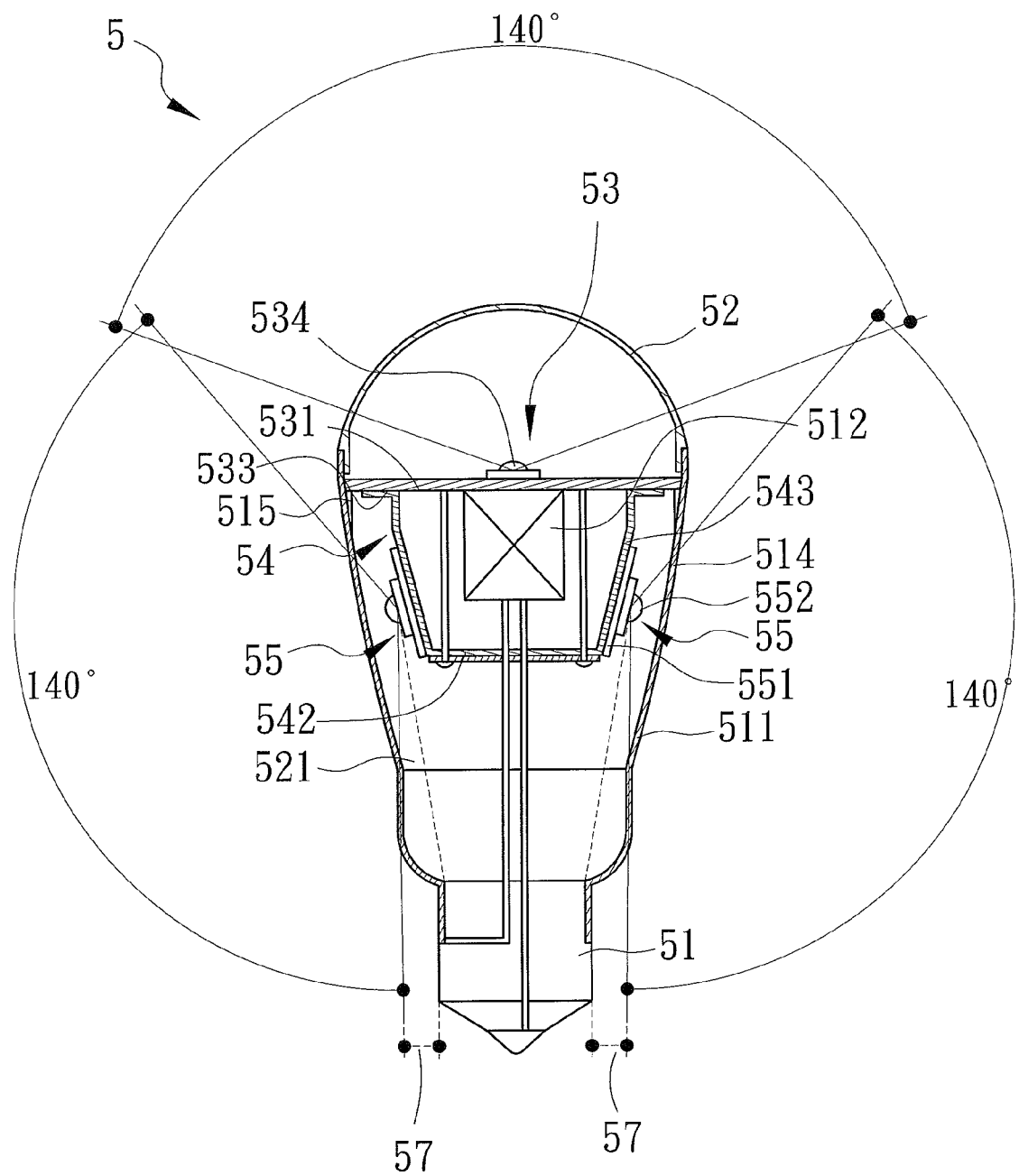
FIG. 20 is a cross sectional view of a LED bulb according to a third embodiment of the present invention.

FIG. 20 shows a LED bulb 5 of a third preferred embodiment of the present invention modified from the first embodiment. In particular, each side wall 543 shown in FIG. 20 includes an upper section formed as a straight-lateral planar wall (straight flank) and a lower section formed as an oblique-lateral planar wall (oblique flank). Further, the actuator 512 is mounted on the lower surface 533 of the upper LED substrate 531 and in the heat dissipating seat 54. With the actuator 512 designed in the heat dissipating seat 54, a beam angle of downward light is expanded (or a halo 57 is developed on both sides of the bulb holder 51). That is, no shade is created because no ray is blocked by the actuator 512 in the bulb holder 51 and the conductive place 514 (see the actuator 512 and the conductive place 514 in FIG. 10).

Figure 21:
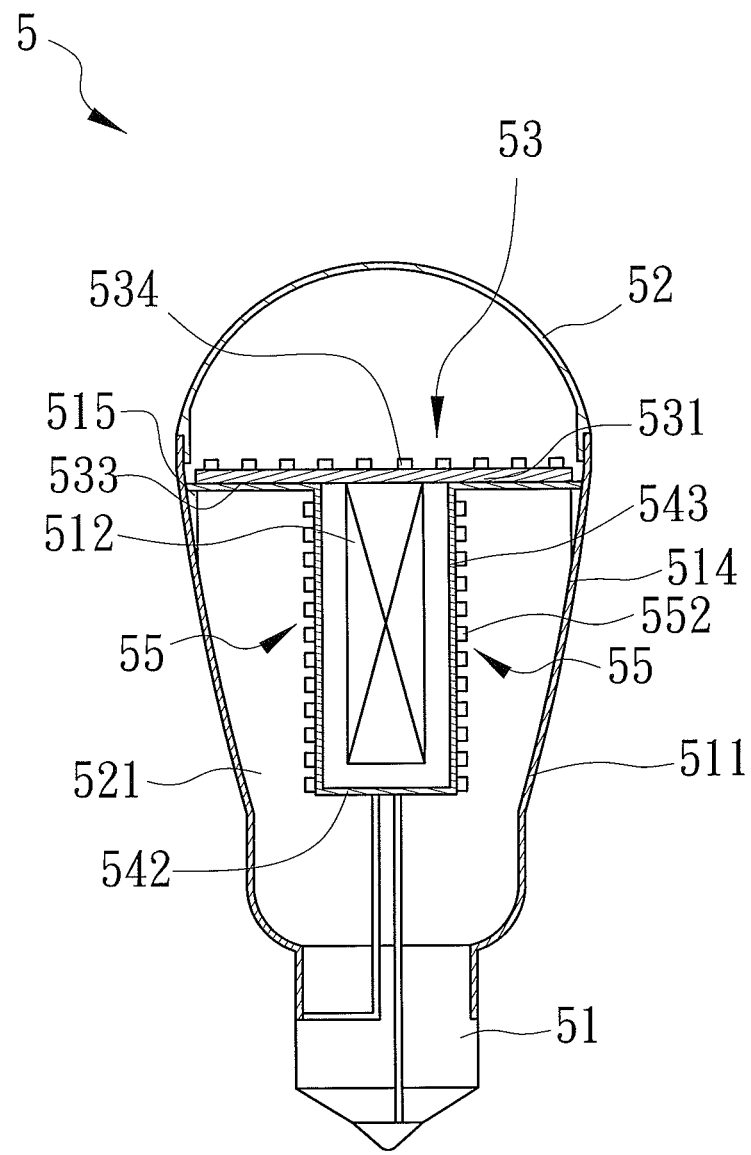
FIG. 21 is a cross sectional view of a LED bulb according to a fourth embodiment of the present invention.
Figure 22:
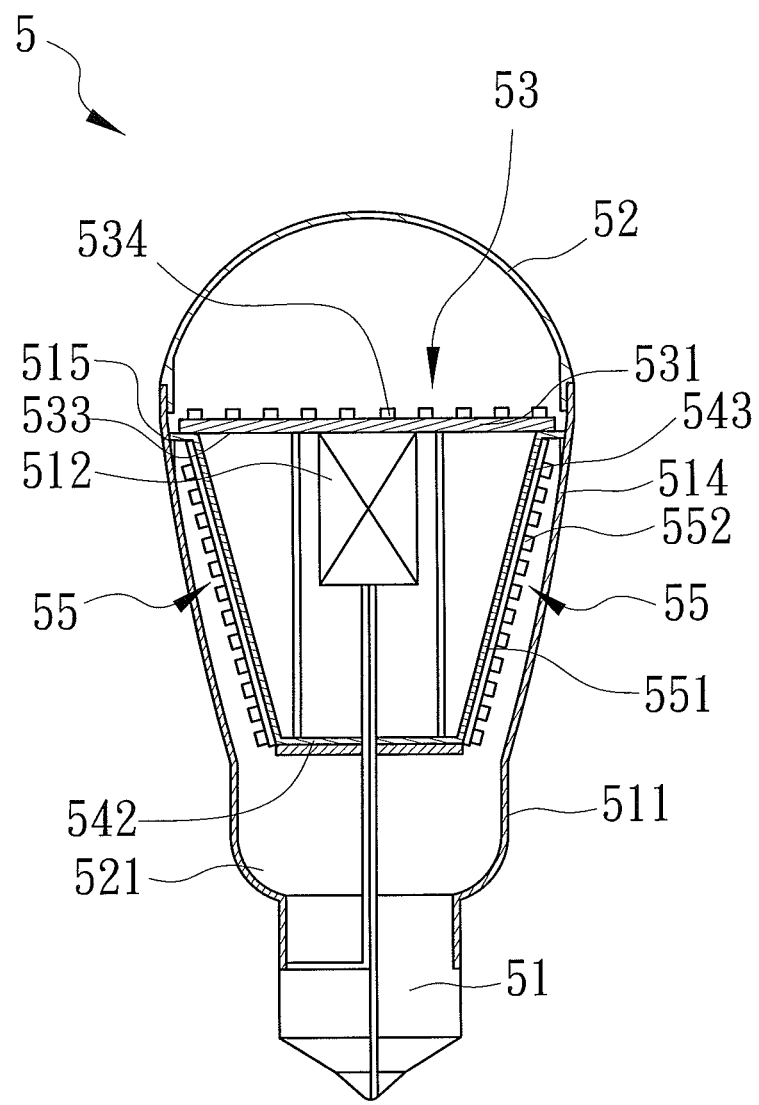
FIG. 22 is a cross sectional view of a LED bulb according to a fifth embodiment of the present invention.

FIG. 21 shows a LED bulb 5 of a fourth preferred embodiment of the present invention, wherein each side wall 543 is formed as a straight-lateral planar wall, and the actuator 512 is mounted on the lower surface 533 of the upper LED substrate 531. FIG. 22 shows a LED bulb 5 of a fifth preferred embodiment of the present invention, wherein each side wall 543 is formed as an oblique-lateral planar wall, and the actuator 512 is mounted on the lower surface 533 of the upper LED substrate 531. Furthermore, FIGS. 21 and 22 show that the upper portion 541 of the heat dissipating seat 54 is disposed on the annular ledge 515, while FIG. 10 shows that the upper LED substrate 531 is disposed on the annular ledge 515 and engaged with the upper portion 541 of the heat dissipating seat 54. Alternatively, the upper LED substrate 531 can be substitute with a support board to be mounted on the ledge 515 and engaged with the upper portion 541 of the heat dissipating seat 54.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A 360-degree projection LED bulb structure comprising, in combination:
    a bulb holder;
    a transparent bulb seat including a lower end engaged to the bulb holder, with the transparent bulb seat further including a top opening formed in an upper end of the transparent bulb seat;
    a transparent bulb shell engaged with the upper end of the transparent bulb seat and closing the top opening of the transparent bulb seat, with the transparent bulb seat and the transparent bulb shell together defining a chamber therein, with an actuator mounted in the chamber;
    a heat dissipating seat mounted in the chamber and including an upper portion, a lower portion, and a plurality of side walls located between the upper and lower portions, with the plurality of side walls adjoining each other to form an annular polygon; and
    a plurality of sidelight luminosity modules each mounted on an outer surface of one of the side walls of the heat dissipating seat, with each of the sidelight luminosity modules including a lateral LED substrate and at least one lateral LED disposed on an outer face of the lateral LED substrate, with each of the sidelight luminosity modules electrically connected to the actuator so that the lateral LED can be driven to radiate horizontally and downward via the transparent bulb seat.

2. The LED bulb structure according to claim 1, further comprising:
    an upper luminosity module mounted in the chamber and including an upper LED substrate suspended and supported within the upper end of the transparent bulb seat, with the upper LED substrate including an upper end face facing the transparent bulb shell and a lower end face facing the bulb holder, with at least one upper LED disposed on the upper end face of the upper LED substrate, with the upper luminosity module electrically connected to the actuator so that the at least one upper LED of the upper luminosity module can be driven to project light beams towards the transparent bulb shell, with the heat dissipating seat engaged on the lower end face of the upper LED substrate.

3. The LED bulb structure according to claim 2, with a conductive substrate mounted on a bottom face of the lower portion of the heat dissipating seat, with the conductive substrate electrically connected to the actuator, the at least one upper LED of the upper luminosity module, and the lateral LEDs of the sidelight luminosity modules through conductive filaments, with an annular ledge formed on an inner wall of the upper end of transparent bulb seat, with the upper LED substrate or the upper portion of the heat dissipating seat mounted on the ledge.

4. The LED bulb structure according to claim 3, with the heat dissipating seat being in the form of one of a solid body, tank-shaped body, and a polygonal hollow tube.

5. The LED bulb structure according to claim 3, with the heat dissipating seat being a hollow tank-shaped body manufactured with a high thermal conductive material and provided with cooling fins therein, with the upper portion of the heat dissipating seat formed with a planar fixing base and including a plurality of fixing holes so that the upper portion of the heat dissipating seat can be fixed to the lower surface of the upper LED substrate by extending a fastener through each of the fixing holes.

6. The LED bulb structure according to claim 5, with each of the side walls of the heat dissipating seat including an upper section formed as a straight-lateral planar wall and a lower section formed as an oblique-lateral planar wall.

7. The LED bulb structure according to claim 5, with each of the side walls of the heat dissipating seat being a straight-lateral planar wall.

8. The LED bulb structure according to claim 4, with the upper LED substrate including a plurality of ventilation holes extending from the upper end face through the lower end face of the upper LED substrate, with the conductive substrate including a plurality of ventilation holes for cooling, with each lateral LED substrate provided with a conductive welding position at each of two sides thereof to allow circuits of the sidelight luminosity modules to be electrically connected to each other.

9. The LED bulb structure according to claim 8, with the actuator mounted in the lower end of the transparent bulb seat, with a conductive plate provided on an upper end face of the actuator, with the upper portion of the heat dissipating seat formed with a planar fixing base and including a plurality of fixing holes.

10. The LED bulb structure according to claim 8, with the actuator mounted on the lower end face of the upper LED substrate and built-in the heat dissipating seat.

\* \* \* \* \*